3,600,128
PROCESS FOR IRON REMOVAL FROM
ZINC CHLORIDE SOLUTIONS
William A. Schulze, Cleveland, Ohio, assignor to E. I.
du Pont de Nemours and Company, Wilmington, Del.
No Drawing. Filed Feb. 18, 1969, Ser. No. 800,278
Int. Cl. C01g 9/04
U.S. Cl. 23—97        4 Claims

ABSTRACT OF THE DISCLOSURE

This specification discloses a process for removing iron compounds from a zinc chloride solution containing dissolved therein small quantities of organic matter by first contacting the solution with activated carbon and thereafter adding an oxidizer to precipitate the iron out of solution. The activated carbon and iron solids are removed either by filtration or by other conventional techniques such as settling or centrifuging. The process improves the filtration rate.

BACKGROUND OF THE INVENTION

Zinc chloride solutions are used to prepare galvanizing, soldering, and tinning fluxes as well as dry cell batteries and paper pulps for the hard fiber industry. These uses require zinc chloride solutions of unusually high purity. Concentrated solutions of zinc chloride ($ZnCl_2$) also are useful as a solvent medium in which to homopolymerize acrylonitrile. Such solutions also must be of unusually high purity because iron impurities tend to affect (1) the rate at which acrylonitrile polymerizes, (2) the chain length of the polyacrylonitrile, i.e., the molecular weight, and/or (3) the color of polyacrylonitrile fibers spun from a solution of zinc chloride.

In the past, aqueous solutions of zinc chloride have been made by treating zinc ash and/or sal skimming by-products from zinc smelters or galvanizing operations. The zinc ash, composed largely of metallic zinc and zinc oxide (ZnO), is admixed into an aqueous solution of hydrogen chloride. The zinc and zinc oxide are thereby converted to zinc chloride according to the equations:

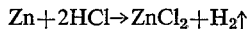

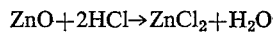

The solution is stirred until the metallic zinc is dissolved and until the pH is increased to about 2 by dissolving an excess of zinc oxide in the crude zinc chloride solution. The solution may then be filtered or settled to remove undissolved residues of zinc compounds as well as other solid foreign materials. The zinc chloride solution generally has dissolved therein iron compounds as well as minor amounts of organic matter, aluminum, copper, lead, nickel, cadmium, calcium, and sulfates. It has been the practice in the past to remove the calcium by precipitation as the sulfate and to remove the iron compounds by adding to the solution sufficient amounts of an oxidizer, such as sodium chlorate ($NaClO_3$), to oxidize the iron compounds thereby causing same to precipitate out. Activated carbon is then added to the system to adsorb dissolved organic media. The solution is filtered or settled to remove precipitated iron matter and the activated carbon. After other trace elements are removed, the resulting zinc chloride aqueous solution is suitable for preparing galvanizing and tinning fluxes, for the manufacture of dry batteries, for treating paper pulps for the fiberboard industry, or as a solvent for polymerizing acrylonitrile.

While acceptable zinc chloride solutions are obtained by this process, the process suffers from the deficiency that it takes a long time for the precipitated iron compounds to coagulate to a size which is readily filterable or settleable. The rate of coagulation has an effect on particle size and thus on the capacity of the filter or settler used to remove the precipitate and the activated carbon from the zinc chloride solution. Thus, the rate of coagulation is the "limiting factor" in the process for recovering zinc chloride solutions.

DESCRIPTION OF THE INVENTION

It has been found that the rate at which the coagulation takes place may be materially improved. This improvement is accomplished by treating the zinc solution first with activated carbon to completely adsorb dissolved organic matter and thereafter adding the oxidizer to effect precipitation. It is believed that the increase in coagulation rate is due to the fact that organic matter is no longer present during the oxidizing step, it having been adsorbed previously on the activated carbon. In addition to improving the filtration rate, the increase in coagulation rate has materially lengthened the useful life of the filter bed. As a result, the filter bed does not have to be renewed as often to maintain a satisfactory filtration rate. Thus, the filter may handle a larger throughput per filter bed change. If the solution is settled or centrifuged rather than filtered, rates in these operations are also improved.

It is proposed by the process of this invention to make zinc chloride solutions by the following process: Zinc ash and/or sal skimmings are admixed with hydrochloric acid in a suitable container where a crude zinc chloride solution is formed. The solution is stirred at a temperature between 55° C. and 120° C., preferably at about 60° C., until it reaches a pH greater than 2 as a result of excess zinc oxide being dissolved therein. The solution thereafter is concentrated to 40–59 Bé., preferably 55–59 Bé., by pumping the solution under pressure thru a shell and tube heat exchanger and flashing the water off or by boiling in tanks equipped with steam coils. If desired, the zinc ash may be ball milled prior to being added to the hydrochloric acid. The hydrochloric acid solution used in this process may be any suitable strength. Thus, the solution may have between 10% and 36%, by weight, of hydrochloric acid.

The crude zinc chloride solution may be filtered or settled at this point to remove any undissolved solids. If a filtration step is used, any suitable filter may be used such as plate and frame, rotary drum, or pressure leaf filter. The size of the filter is of course dependent upon many variables, such as the flow rate and purity of the zinc ash.

Following filtration, activated carbon is added to the crude solution to adsorb any dissolved organic matter. The amount of activated carbon will depend on the amount of organic matter present. Generally from 5 parts to 10 parts by weight of activated carbon per 10,000 parts by weight of solution is sufficient. The adsorption is generally carried out at a temperature of between 15° C. and 120° C., with about 60–90° C. being preferred. Various kinds of activated carbon may be used such as those derived from vegetable carbons. While any sized activated carbon may be used, it has been found that a mesh size between 2 and 44 microns gives particularly good results due to the high surface area and relatively good filtration properties. A mesh size of 4–8 microns is preferred. Preferably, at least 1 hour adsorption time should be allowed before adding the oxidizer. To minimize the time lapse, the activated carbon may be added in any unit operation step prior to oxidation. Following the addition of activated carbon, the calcium is precipitated as the sulfate and the solution is treated with an oxidizing agent to precipitate iron compounds. Suitable oxidizers include sodium chlorate (NaClO₃), potassium chlorate (KClO₃), hydrogen peroxide (H₂O₂), sodium peroxide (Na₂O₂), barium peroxide (BaO₂), chlorine, bromine, nitric acid, sodium hypochlorite (NaClO), and potassium permanganate (KMnO₄), with sodium chlorate being preferred. Iron is believed to be present in the form of reduced iron chloride (FeCl₂) and to react with the oxidizer to form hydroxides. Excess zinc oxide above stoichiometric proportions must be present to react with any by-product acid which is formed, such as hydrochloric acid which is released when sodium chlorate is used. The iron compounds probably form solids via the following reaction when NaClO₃ is used:

$$6FeCl_2 + NaClO_3 + 6ZnO + 9H_2O \rightarrow$$
$$NaCl + 6Fe(OH)_3\downarrow + 6ZnCl_2$$

Analogous reactions probably occur with alternate oxidizers. The oxidizing step may take place at any temperature but preferably occurs between 70° C. and 90° C.

The final step in the process is filtration of the precipitated iron and calcium compounds as well as the spent activated carbon. As in the case of the prior filtration, any suitable filter or settling technique may be used. The resulting zinc chloride solution may be used per se, the solution may be further purified, or zinc chloride solid may be recovered by boiling off the water.

The instant procedure has considerably increased the rates in this final filtration. The rate increase ranges from 2-fold to 25-fold. These rates permit filtering much more solution before the filtration rate decreases to the point where the filter bed must be renewed. The higher rates result in smaller equipment and in less frequent cleaning of the filters, both of which reduce the cost of making zinc chloride solutions. Another advantage lies in the fact that raw starting materials having lower proportions of zinc oxide and more impurities (notably aluminum compounds) may be used in this process while still maintaining acceptable filtration rates.

It should be recognized that in addition to iron impurities, a zinc chloride solution may contain other impurities in the form of aluminum, copper, lead, cadmium, nickel, calcium, and sulfate-containing compounds depending on the source and purity of the zinc ash and/or sal skimmings. The process of this invention will remove dissolved aluminum compounds by precipitation as the hydroxide in the presence of excess zinc oxide. The remaining compounds may be removed by procedures well known in the art.

Example I

A mixture composed of 1000 gm. of zinc ash and 500 gm. of sal skimmings, both containing iron in the form of metallic iron (dross), iron oxide, and iron chloride, is ball milled to break up agglomerated lumps. The resulting powder is admixed into 3.2 liters of 31.4% hydrochloric acid solution at a rate to give a reaction temperature of about 60° C. The crude zinc chloride solution which is thus formed contains dissolved ferrous iron and an excess of dissolved zinc oxide. This solution is filtered in a Buchner funnel to remove any undissolved solids and then concentrated to 55° Bé. by boiling. At this point the crude zinc chloride contains 0.54% dissolved ferrous iron and 0.61% of dissolved zinc oxide. This amount of zinc oxide is low since, by calculation, a 0.79% zinc oxide content would be required to effectively neutralize the hydrochloric acid released during oxidation of the iron with sodium chlorate. The crude solution was aliquoted to give 4 homogeneous portions of 400 ml. (625 gm.) each.

To a 400 ml. sample of the above crude filtered zinc chloride solution at 82° C., 4.0 gm. of zinc oxide is added. Calcium is precipitated by the addition of 3.1 gm. of sulfuric acid; the sulfuric acid consumes 2.5 gm. of the zinc oxide to give a residual zinc oxide concentration of 0.85% dissolved in the hot zinc chloride solution. Then, 0.315 gm. of activated carbon is admixed for 1 hr. at 82° C. A slight excess of sodium chlorate is next added to precipitate the iron. The resulting mixture is aged in an 82° C. oven for 2½ hr., mixed thoroughly, and filtered. In 0.5 min., 100 ml. of clear filtrate is obtained. The iron content of the filtered zinc chloride solution is 10 parts per million.

Example II

An aliquot of the crude filtered zinc chloride solution prepared in Example I is treated with activated carbon and sodium chlorate except that the activated carbon is added to the solution after the sodium chlorate addition. The final filtering step takes 12.5 min. to obtain 100 ml. of clear filtrate.

As can be seen from comparing the results in Examples I and II, the filtering step in Example I is 25 times faster than in Example II.

Example III

An aliquot of the crude filtered zinc chloride solution of Example I is treated in accordance with Example I, except that no activated carbon is added. In the final filtering step, the precipitated iron is too fine to be retained by the filter.

Example IV

An aliquot of the crude filtered zinc chloride solution is prepared in accordance with Example I except that the activated carbon is admixed for 15 minutes before iron is precipitated with sodium chlorate. In the final filtering step, 100 ml. of clear filtrate is obtained in 4.6 min.

As can be seen in comparing the results in Examples II and IV, the filtering step in Example IV is 2.7 times faster than that in Example II.

I claim:
1. In a process for removing iron compounds from an aqueous solution of zinc chloride containing organic matter dissolved therein, said process comprising the steps of contacting the solution activated carbon, contacting the solution with an oxidizing agent to precipitate iron compounds, and separating the solution from the solid material by filtering, centrifuging, or settling; the improvement resulting in an increase of both the coagulation rate and the separation rate, said improvement comprising:
  (1) carrying out the step of contacting the solution with activated carbon prior to the step of contacting the solution with the oxidizing agent;
  (2) carrying out the step of contacting the solution with the oxidizing agent without first removing the activated carbon and the organic matter adsorbed thereon; and
  (3) separating the solution from the precipitated iron compounds and activated carbon with organic matter adsorbed thereon.

2. The process of claim 1 wherein said oxidizing agent is sodium chlorate.

3. In a process for making zinc chloride solution from zinc ash or sal skimmings, said process comprising the steps of adding to said zinc ash or sal skimmings aqueous hydrogen chloride to form a crude zinc chloride solution containing dissolved therein iron compounds and organic matter, separating the solution from solid material, contacting the solution with activated carbon to remove organic matter dissolved in the solution, contacting the solution with an oxidizing agent to precipitate iron compounds, and separating the solution by filtering, centrifuging, or settling; the improvement resulting in an increase of both the coagulation rate and the separation rate, said improvement comprising:
  (1) carrying out the step of contacting the solution with activated carbon prior to the step of contacting the solution with the oxidizing agent;
  (2) carrying out the step of contacting the solution with the oxidizing agent without first removing the activated carbon and the organic matter adsorbed thereon; and (3) separating the solution from the precipitated iron compounds and activated carbon with organic matter adsorbed thereon.

4. The process of claim 3 wherein said oxidizing agent is sodium chlorate.

References Cited

UNITED STATES PATENTS

| | | | |
|---|---|---|---|
| 1,706,196 | 3/1929 | Vohl et al. | 23—97 |
| 1,744,981 | 1/1930 | McClellan | 23—97 |
| 1,839,220 | 1/1932 | Henglein et al. | 23—97 |
| 2,746,840 | 5/1956 | Davis | 23—97 |
| 3,148,944 | 9/1964 | Van Dijk et al. | 23—97 |
| 3,337,296 | 8/1967 | Hill | 23—97 |

FOREIGN PATENTS

| | | | |
|---|---|---|---|
| 3,008 | 1878 | Great Britain | 23—97 |
| 652,460 | 4/1951 | Great Britain | 23—97 |
| 69,679 | 1941 | Czechoslovakia | 23—97 |

OTHER REFERENCES

"Natural Gas," article by James B. Garner, vol. 5, No. 11, November 1924, pp. 3, 4, 46, 48, 54 and 56.

"The Condensed Chemical Dictionary," sixth edition, 1962, p. 22, Reinhold Publishing Corp., New York.

"Hackh's Chemical Dictionary" by J. Grant, third ed., revised, 1944, pp. 340 and 341, McGraw-Hill Book Co., Inc., New York.

EDWARD STERN, Primary Examiner

U.S. Cl. X.R.

23—1, 143, 200